United States Patent
Kushwaha

(10) Patent No.: US 9,912,641 B2
(45) Date of Patent: Mar. 6, 2018

(54) SYSTEM, METHOD, AND APPARATUS FOR INSPECTING ONLINE COMMUNICATION SESSIONS VIA POLYMORPHIC SECURITY PROXIES

(71) Applicant: Juniper Networks, Inc., Sunnyvale, CA (US)

(72) Inventor: Deepak Kushwaha, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 737 days.

(21) Appl. No.: 14/324,068

(22) Filed: Jul. 3, 2014

(65) Prior Publication Data

US 2016/0006698 A1     Jan. 7, 2016

(51) Int. Cl.
*H04L 29/06*     (2006.01)

(52) U.S. Cl.
CPC ...... *H04L 63/0281* (2013.01); *H04L 63/1408* (2013.01)

(58) Field of Classification Search
CPC .................................................. H04L 63/0281
See application file for complete search history.

(56) References Cited

U.S. PATENT DOCUMENTS

| | | | |
|---|---|---|---|
| 8,446,840 B2 | 5/2013 | Xie et al. | |
| 8,477,605 B2 * | 7/2013 | Elliott et al. | 370/230 |
| 8,782,221 B2 * | 7/2014 | Han | 709/224 |
| 9,009,332 B1 * | 4/2015 | Remizov | 709/227 |
| 9,021,578 B1 * | 4/2015 | Casaburi et al. | 726/15 |
| 2003/0204719 A1 | 10/2003 | Ben-Itzhak | |
| 2008/0282338 A1 | 11/2008 | Beer | |
| 2009/0158416 A1 * | 6/2009 | Statia | 726/12 |
| 2013/0083799 A1 * | 4/2013 | Xie et al. | 370/394 |
| 2013/0111038 A1 | 5/2013 | Girard | |
| 2013/0136139 A1 * | 5/2013 | Zheng et al. | 370/401 |
| 2014/0082204 A1 * | 3/2014 | Shankar et al. | 709/227 |
| 2014/0096198 A1 | 4/2014 | Brunson et al. | |
| 2014/0283000 A1 * | 9/2014 | Radhakrishnan | 726/12 |
| 2016/0112544 A1 * | 4/2016 | Girard | H04L 69/16 709/230 |

\* cited by examiner

*Primary Examiner* — Jeffrey Pwu
*Assistant Examiner* — William Corum, Jr.
(74) *Attorney, Agent, or Firm* — FisherBroyles, LLP

(57) ABSTRACT

The disclosed computer-implemented method may include (1) detecting an online communication session established between a plurality of computing devices, (2) identifying at least one application involved in the online communication session established between the plurality of computing devices, (3) determining a security mode for a security proxy that inspects the online communication session based at least in part on the application involved in the online communication session, and then (4) configuring the security proxy to inspect the online communication session in accordance with the determined security mode. Various other systems, methods, and apparatuses are also disclosed.

17 Claims, 6 Drawing Sheets

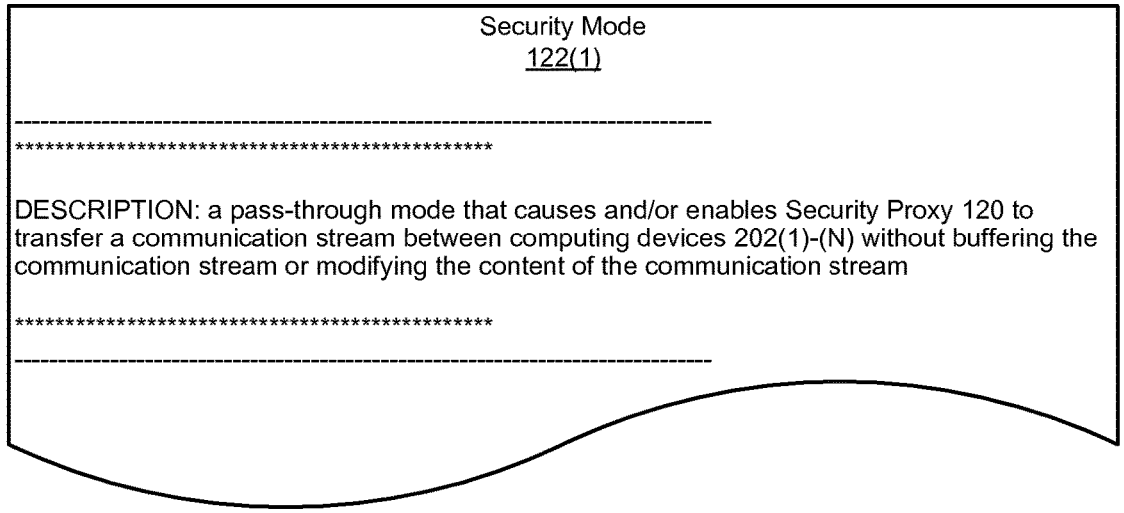
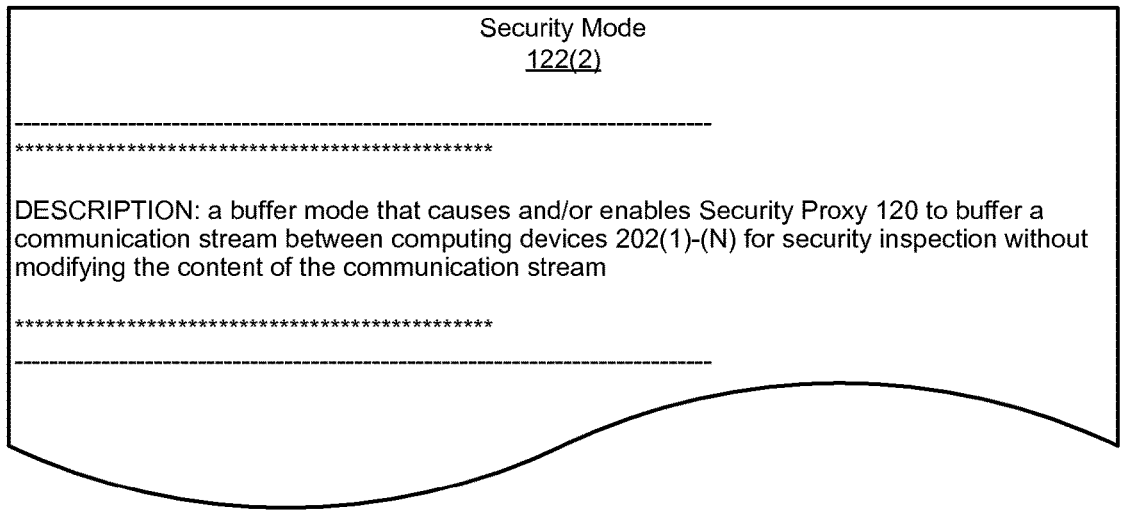
FIG. 4

Security Mode
122(3)

DESCRIPTION: a re-write mode that causes and/or enables Security Proxy 120 to modify the content of a communication stream transferred between computing devices 202(1)-(N) on a temporary basis Security Mode
122(4)

DESCRIPTION: a full proxy mode that causes and/or enables Security Proxy 120 to modify the content of a communication stream transferred between computing devices 202(1)-(N) on a substantially continuous basis

*FIG. 5*

SYSTEM, METHOD, AND APPARATUS FOR INSPECTING ONLINE COMMUNICATION SESSIONS VIA POLYMORPHIC SECURITY PROXIES

BACKGROUND

Network security services often inspect online communication sessions for potential security risks. For example, a Layer 7 security service may provide a traditional Transmission Control Protocol (TCP) proxy that performs a security inspection on a TCP session established between a server and a client. In this example, the security inspection may involve reassembling, buffering, and/or modifying a stream transferred between the server and client during the TCP session.

Unfortunately, this type of security inspection may lead to the consumption of a significant amount of resources. For example, the traditional TCP proxy may involve the server and/or client emulators saving packets, timers, and/or acknowledgements as well as performing retransmissions in order to facilitate this type of security inspection. The traditional TCP proxy, however, may fail to take into account whether the TCP session actually necessitates such an extensive security inspection.

The instant disclosure, therefore, identifies and addresses a need for improved systems, methods, and apparatuses for inspecting online communication sessions via polymorphic security proxies.

SUMMARY

As will be described in greater detail below, the instant disclosure generally relates to systems, methods, and apparatuses for inspecting online communication sessions via polymorphic security proxies. In one example, a computer-implemented method for accomplishing such a task may include (1) detecting an online communication session established between a plurality of computing devices, (2) identifying at least one application involved in the online communication session established between the plurality of computing devices, (3) determining a security mode for a security proxy that inspects the online communication session based at least in part on the application involved in the online communication session, and then (4) configuring the security proxy to inspect the online communication session in accordance with the determined security mode.

Similarly, a system for implementing the above-described method may include (1) a detection module, stored in memory, that detects an online communication session established between a plurality of computing devices, (2) an identification module, stored in memory, that identifies at least one application involved in the online communication session established between the plurality of computing devices, (3) a determination module, stored in memory, that determines a security mode for a security proxy that inspects the online communication session based at least in part on the application involved in the online communication session, (4) a configuration module, stored in memory, that configures the security proxy to inspect the online communication session in accordance with the determined security mode, and (5) at least one processor that executes the detection module, the identification module, the determination module, and the configuration module.

Additionally or alternatively, an apparatus for implementing the above-described method may include (1) a server that facilitates an online communication session established between a plurality of computing devices and (2) a security proxy that directs the server to (A) identify at least one application involved in the online communication session established between the plurality of computing devices, (B) determine, based at least in part on the application involved in the online communication session, a security mode that satisfies the needs of the application, and then (C) inspect the online communication session in accordance with the determined security mode.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration that describes exemplary security modes.

FIG. 5 is an illustration that describes exemplary security modes.

Figure 1:
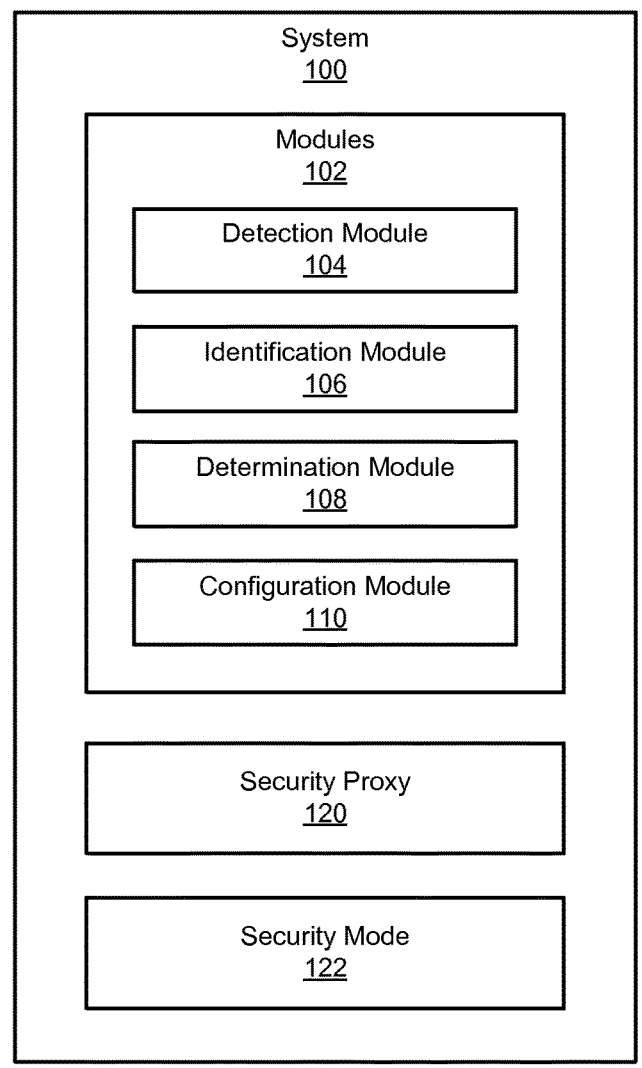
FIG. 1 is a block diagram of an exemplary apparatus for inspecting online communication sessions via polymorphic security proxies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems, methods, and apparatuses for inspecting online communication sessions via polymorphic security proxies. The term "polymorphic security proxy," as used herein, generally refers to any type or form of security proxy whose security mode is selected and/or changed based at least in part on certain characteristics and/or attributes of an online communication session. In one example, a polymorphic security proxy may select and/or change the security mode once or more during the life of an online communication session between a server and a client. In other words, the polymorphic security proxy may continue determining and/or reconfiguring the most efficient security mode throughout the life of the online communication session.

As will be explained in greater detail below, embodiments of the instant disclosure may identify and/or monitor an application involved in a TCP session established between a server and a client. Embodiments of the instant disclosure may also determine, based at least in part on the monitored behavior of the application, the most efficient security mode for the TCP session. In other words, these embodiments may select the security mode that causes the lowest level of resource consumption while satisfying the needs of the identified applications.

Embodiments of the instant disclosure may then configure a security proxy to inspect the TCP session in accordance with the most efficient security mode for the TCP session. By configuring the security proxy to inspect the TCP session in this way, these embodiments may lead to a reduction in the amount of time and/or network resources consumed in connection with the inspection. For example, these embodiments may enable the security proxy to perform a security inspection on the TCP session such that the server and/or client emulators need not save certain packets, timers, and/or acknowledgments nor perform certain retransmissions to facilitate the security inspection.

Figure 2:
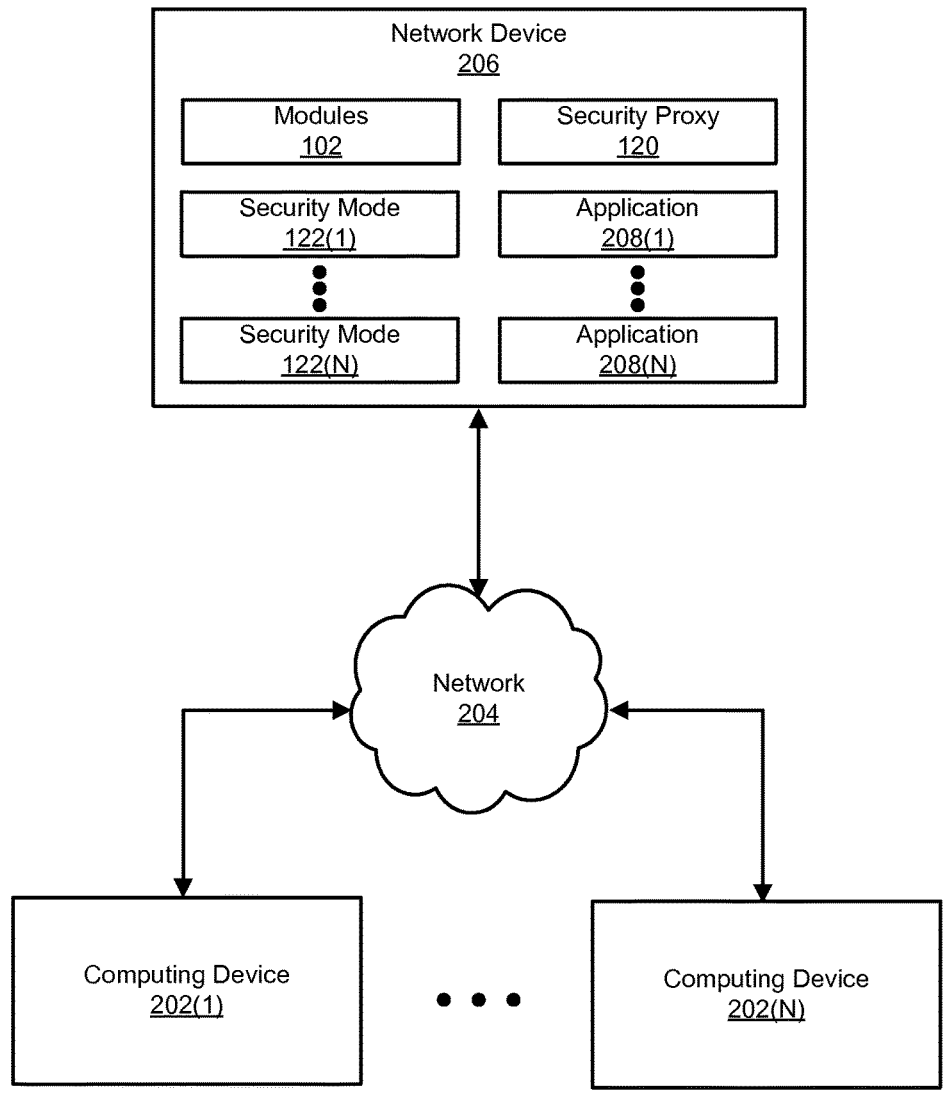
FIG. 2 is a block diagram of an exemplary apparatus for inspecting online communication sessions via polymorphic security proxies.

The following will provide, with reference to FIGS. 1 and 2, detailed descriptions of exemplary systems for inspecting online communication sessions via polymorphic security proxies. Detailed descriptions of corresponding computer-implemented methods will also be provided in connection with FIG. 3. In addition, detailed descriptions of exemplary security modes will be provided in connection with FIGS. 4 and 5. Finally, detailed descriptions of an exemplary apparatus for inspecting online communication sessions via polymorphic security proxies will be provided in connection with FIG. 6.

FIG. 1 is a block diagram of an exemplary system 100 for inspecting online communication sessions via polymorphic security proxies. As illustrated in this figure, exemplary system 100 may include one or more modules 102 for performing one or more tasks. For example, and as will be explained in greater detail below, exemplary system 100 may include a detection module 104 that detects an online communication session established between a plurality of computing devices. Exemplary system 100 may also include an identification module 106 that identifies at least one application involved in the online communication session established between the plurality of computing devices.

Moreover, and as will be described in greater detail below, exemplary system 100 may include a determination module 108 that determines a security mode for a security proxy that inspects the online communication session based at least in part on the application involved in the online communication session. Exemplary system 100 may further include a configuration module 110 that configures the security proxy to inspect the online communication session in accordance with the determined security mode. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., network device 206 and/or computing devices 202(1)-(N)), and/or apparatus 600 in FIG. 6.

As illustrated in FIG. 1, exemplary system 100 may also include one or more security proxies, such as security proxy 120. The term "security proxy," as used herein, generally refers to any type or form of interface, agent, and/or module that facilitates transmission of a communication stream between computing devices and/or performs a security inspection on the communication stream. In one example, security proxy 120 may represent and/or include a TCP proxy that facilitates a TCP session established between a physical server and a physical client. Additionally or alternatively, security proxy 120 may perform a security inspection on a communication stream transferred between the physical server and the physical client during this TCP session.

In one example, security proxy 120 may include a server emulator and/or a client emulator. In this example, the physical client may communicate with the physical server via the server emulator included in security proxy 120. Additionally or alternatively, the physical server may communicate with the physical client via the client emulator included in security proxy 120.

As illustrated in FIG. 1, exemplary system 100 may also include one or more security modes, such as security mode 122. The term "security mode," as used herein, generally refers to any type or form of mode, behavior, and/or personality that controls a security inspection performed on an online communication session. In one example, security mode 122 may define the level of invasiveness and/or thoroughness applied during a security inspection performed on a TCP session.

Examples of security mode 122 include, without limitation, (1) a pass-through mode that enables a security proxy to transfer a communication stream without buffering the communication stream or modifying the content of the communication stream, (2) a buffer mode that enables a security proxy to buffer a communication stream for a security inspection without modifying the content of the communication stream, (3) a re-write mode that enables a security proxy to modify the content of a communication stream on a temporary basis, (4) a full proxy mode that enables a security proxy to modify the content of a communication stream on a substantially continuous basis, combinations of one or more of the same, or any other suitable security mode.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 206 in communication with one or more computing devices 202(1)-(N) via a network 204. Although illustrated independent from network 204 in FIG. 2, network device 206 and/or one or more of computing devices 202(1)-(N) may represent portions of network 204.

In one embodiment, network device 206 may be programmed with one or more of modules 102. In this embodiment, network device 206 may include security proxy 120. Network device 206 may be able to configure security proxy 120 in accordance with one or more of security modes 122(1)-(N).

Additionally or alternatively, network device 206 may include one or more applications 208(1)-(N) capable of performing certain services and/or tasks in connection with an online communication session. Examples of applications 208(1)-(N) include, without limitation, application identification software, computer security applications, antivirus applications, Intrusion Detection and Prevention (IDP) applications, Unified Threat Management (UTM) applications, firewall applications, Unified Access Control (UAC) applications, Secure Sockets Layer (SSL) proxies, Transport Layer Security (TLS) proxies, Application Layer Gateways (ALGs), combinations of one or more of the same, or any other suitable applications.

In one embodiment, one or more of modules 102 from FIG. 1 may, when executed by at least one processor of network device 206, enable network device 206 to inspect online communication sessions via polymorphic security proxies. For example, and as will be described in greater detail below, one or more of modules 102 may cause network device 206 to (1) detect an online communication session established between computing devices 202(1) and 202(N), (2) identify application 208(1) as being involved in the online communication session established between computing devices 202(1) and 202(N), (3) determine a security mode for security proxy 120 based at least in part on application 208(1) being involved in the online communication session, and then (4) configure security proxy 120 to inspect the online communication session in accordance with the determined security mode.

Computing devices 202(1)-(N) generally represent any type or form of computing device capable of reading computer-executable instructions. Examples of computing devices 202(1)-(N) include, without limitation, laptops, tablets, desktops, clients, servers, cellular phones, Field Programmable Gate Arrays (FPGAs), Personal Digital Assistants (PDAs), multimedia players, embedded systems, wearable devices (e.g., smart watches, smart glasses, etc.), gaming consoles, portions of one or more of the same, combinations of one or more of the same, exemplary apparatus 600 in FIG. 6, or any other suitable computing devices.

Network device 206 generally represents any type or form of computing device capable of facilitating, proxying, and/or inspecting online communication sessions. Examples of network devices 206 include, without limitation, routers, switches, network hubs, gateways, service delivery gateways, application servers, database servers, firewalls, Next Generation FireWalls (NGFWs), Deep Packet Inspection (DPI) systems, nodes, bridges, desktops, multimedia players, clients, embedded systems, gaming consoles, exemplary apparatus 600 in FIG. 6, portions of one or more of the same, combinations of one or more of the same, or any other suitable network device.

Network 204 generally represents any type or form of medium and/or architecture capable of facilitating communication or data transfer. In one embodiment, network 204 may include wireless and/or wired connections. Network 204 may include one or more additional network devices not illustrated in FIG. 2. Examples of network 204 include, without limitation, intranets, Wide Area Networks (WANs), Local Area Networks (LANs), Personal Area Networks (PANs), the Internet, Internet Service Provider (ISP) networks, Power Line Communications (PLC) networks, cellular networks (e.g., Global System for Mobile Communications (GSM) networks), wireless networks, portions of one or more of the same, variations of one or more of the same, combinations of one or more of the same, or any other suitable network.

Figure 3:
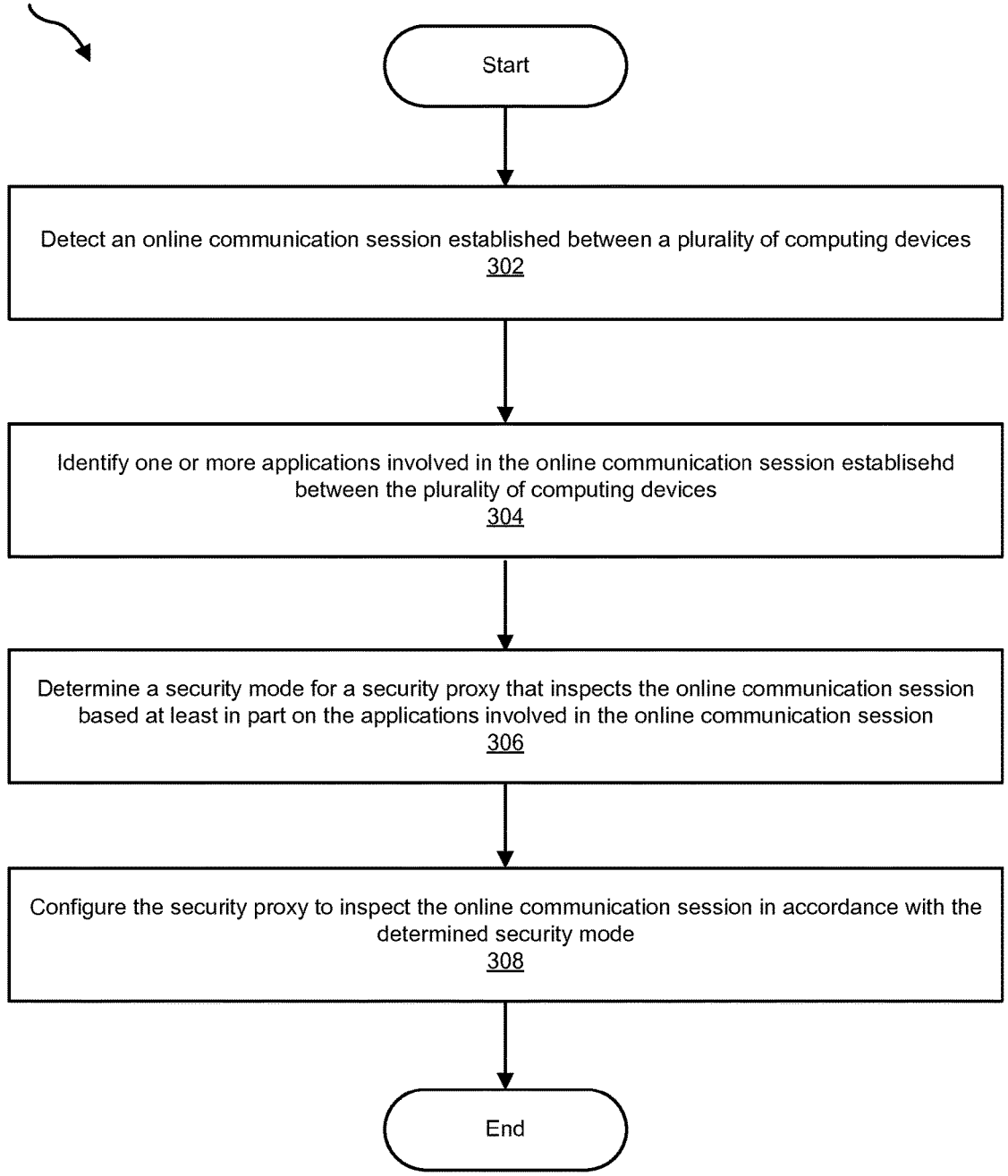
FIG. 3 is a flow diagram of an exemplary method for inspecting online communication sessions via polymorphic security proxies.

FIG. 3 is a flow diagram of an exemplary computer-implemented method 300 for inspecting online communication sessions via polymorphic security proxies. The steps shown in FIG. 3 may be performed by any suitable computer-executable code, computing system, and/or apparatus. In some embodiments, the steps shown in FIG. 3 may be performed by one or more of the components of system 100 in FIG. 1, system 200 in FIG. 2, and/or apparatus 600 in FIG. 6.

As illustrated in FIG. 3, at step 302 one or more of the systems described herein may detect an online communication session established between a plurality of computing devices. For example, detection module 104 may, as part of network device 206 in FIG. 2, detect an online communication session established between computing devices 202(1) and 202(N) via network 204. The term "online communication session," as used herein, generally refers to any type or form of session, instance, and/or period during which computing devices exchange communications with one another via a network. In one example, this online communication session may represent and/or include a TCP session.

The systems described herein may perform step 302 in a variety of ways. In one example, detection module 104 may detect the online communication session at the point in time that the online communication session is established between computing devices 202(1) and 202(N). For example, computing devices 202(1) and 202(N) may establish an online communication session with one another via network device 206. As computing devices 202(1) and 202(N) establish the online communication session, detection module 104 may detect the online communication session.

In one example, detection module 104 may detect the online communication session based at least in part on a request to initiate the online communication session. For example, computing device 202(1) may create a request to initiate a file download and/or a service from computing device 202(N) via an online communication session. Computing device 202(1) may then transmit the request to network device 206 on the way to computing device 202(N) via network 204. As the request reaches network device 206, detection module 104 may detect the request and then determine that computing devices 202(1) and 202(N) are establishing an online communication session with one another based at least in part on the request.

In one example, detection module 104 may detect the online communication session by monitoring network traffic transferred between computing devices 202(1) and 202(N). For example, detection module 104 may monitor network traffic travelling through network device 206. The term "network traffic," as used herein, generally refers to any type or form of data transfer that occurs within a network. While monitoring this network traffic, detection module 104 may identify a packet transferred between computing devices 202(1) and 202(N). Detection module 104 may then determine that an online communication session has been established between computing devices 202(1) and 202(N) based at least in part on the identified packet.

Additionally or alternatively, detection module 104 may detect the online communication session based at least in part on a three-way handshake sequence performed by computing devices 202(1) and 202(N). For example, while monitoring network traffic travelling through network device 206, detection module 104 may detect a SYNchronize (SYN) request transmitted by computing device 202(1) to computing device 202(N). Detection module 104 may then detect a SYN-ACKnowledge (SYN-ACK) response transmitted by computing device 202(N) back to computing device 202(1). Finally, detection module 104 may detect an ACKnowledge (ACK) response transmitted by computing device 202(1) again to computing device 202(N). Detection module 104 may then determine that an online communication session has been established between computing devices 202(1) and 202(N) based at least in part on the SYN request, the SYN-ACK response, and the ACK response transmitted in this three-way handshake sequence.

As illustrated in FIG. 3, at step 304 one or more of the systems described herein may identify at least one application involved in the online communication session established between the plurality of computing devices. For example, identification module 106 may, as part of network device 206 in FIG. 2, identify application 208(1) as being involved in the online communication session established between computing devices 202(1) and 202(N). In this example, application 208(1) may be responsible for performing certain services and/or tasks in connection with the online communication session.

The systems described herein may perform step 304 in a variety of ways. In one example, identification module 106 may identify application 208(1) as being involved in the online communication session based at least in part on a service request. For example, detection module 104 may detect a service request in connection with the online communication session. In this example, the service request may prompt application 208(1) to perform certain services and/or tasks in connection with the online communication session. Upon detection of the service request, identification module 106 may identify application 208(1) as being involved in the online communication session by analyzing the service request.

As a specific example, detection module 104 may detect a request for a UTM application to perform certain services and/or tasks on a communication stream involved in the online communication session. Upon detection of the service request, identification module 106 may identify the UTM application as being involved in the online communication session by analyzing the service request.

In some examples, identification module 106 may deduce that application 208(1) is involved in the online communication session based at least in part on the behavior of the online communication session. In one example, detection module 104 may monitor the behavior of the online communication session. For example, detection module 104 may monitor whether a communication stream involved in the online communication session is reassembled, buffered, and/or modified. Identification module 106 may then identify application 208(1) as being involved in the online communication session based at least in part on whether the communication stream is reassembled, buffered, and/or modified.

As a specific example, while monitoring the online communication session, detection module 104 may detect reassembly of a communication stream involved in the online communication session at network device 206. However, detection module 104 may detect no evidence of buffering or content-based modification of the communication stream at network device 206. Since the communication stream is reassembled but neither buffered nor modified at network device 206, identification module 106 may deduce that an application identification program, an IDP application, and/or a UTM application is performing certain tasks and/or services on the communication stream at network device 206.

In one example, detection module 104 may monitor the behavior of one or more of applications 208(1)-(N). For example, detection module 104 may monitor application 208(1) in an effort to detect any requests to buffer and/or modify the communication stream. While monitoring application 208(1) in this way, detection module 104 may detect a request issued by application 208(1) to buffer and/or modify the communication stream. This request may be directed to security proxy 120.

In one example, identification module 106 may identify applications 208(1)-(N) as being involved in the online communication session established between computing devices 202(1) and 202(N). For example, identification module 106 may identify applications 208(1)-(N) as being involved in the online communication session based at least in part on a plurality of service requests. Additionally or alternatively, identification module 106 may deduce that applications 208(1)-(N) are involved in the online communication session based at least in part on the behavior of the online communication session.

As illustrated in FIG. 3, at step 306 one or more of the systems described herein may determine a security mode for a security proxy that inspects the online communication session based at least in part on the application involved in the online communication session. For example, determination module 108 may, as part of network device 206 in FIG. 2, determine that security mode 122(1) corresponds to application 208(1) involved in the online communication session. In this example, security mode 122(1) may define the level of invasiveness and/or thoroughness applied to security proxy 120 during a security inspection performed on the online communication session.

The systems described herein may perform step 306 in a variety of ways. In one example, determination module 108 may determine which of security modes 122(1)-(N) corresponds to the behavior of application 208(1) based at least in part on the efficiencies of security modes 122(1)-(N). For example, identification module 106 may identify the set of security modes 122(1)-(N) on network device 206. In this example, security modes 122(1)-(N) may cause varying levels of resource consumption when applied to security proxy 120 during security inspections. Additionally or alternatively, security modes 122(1)-(N) may involve varying levels of invasiveness and/or thoroughness when applied to security proxy 120 during security inspections.

In one example, determination module 108 may select, from security modes 122(1)-(N), the most efficient security mode that satisfies the needs of application 208(1). For example, determination module 108 may determine which of security modes 122(1)-(N) satisfy the needs of application 208(1). In this example, determination module 108 may also determine which of the security modes that satisfy the needs of application 208(1) is the most efficient. Determination module 108 may then select this most efficient security mode from security modes 122(1)-(N). The term "most efficient security mode," as used herein, generally refers to the security mode within a set of security modes that causes the lowest level of resource consumption while satisfying the needs of a specific application involved in an online communication session.

In one example, security proxy 120 may save certain communication options (e.g., TCP options) and/or the window size negotiated between computing devices 202(1)-(N). Security proxy 120 may rely on and/or refer to such communication options and/or the negotiated window size when switching from one security mode to another.

FIGS. 4 and 5 are illustrations that describe exemplary security modes 122(1), 122(2), 122(3), and 122(4) (collectively referred to herein as security modes 122(1)-(N)). As illustrated in FIG. 4, security mode 122(1) may represent a pass-through mode (in this example, "a pass-through mode that causes and/or enables Security Proxy 120 to transfer a communication stream between computing devices 202(1)-(N) without buffering the communication stream or modifying the content of the communication stream"). Additionally or alternatively, the pass-through mode represented by security mode 122(1) in FIG. 4 may cause and/or enable security proxy 120 to reassemble the packets encountered at network device 206 during the online communication session. In other words, the pass-through mode represented by security mode 122(1) in FIG. 4 may cause and/or enable security proxy 120 to produce a reassembled communication stream during the online communication session.

In one example, security mode 122(1) may represent the most efficient security mode for application identification software, IDP applications, and/or UTM applications in certain contexts. For example, in the event that application 208(1) represents and/or includes application identification software, an IDP application, and/or a UTM application that simply needs the communication stream to be reassembled (but neither buffered nor modified) for the security inspection, determination module 108 may determine that security mode 122(1) is the most efficient security mode that satisfies the needs of application 208(1). In this example, security mode 122(1) direct security proxy 120 to save a local copy of out-of-order packets without buffering and/or holding such packets prior to transmission. By directing security proxy 120 to save a local copy in this way, security mode 122(1) may facilitate reassembly of the communication stream.

As illustrated in FIG. 4, security mode 122(2) may represent a buffer mode (in this example, "a buffer mode that causes and/or enables Security Proxy 120 to buffer a communication stream between computing devices 202(1)-(N) for security inspection without modifying the content of the communication stream"). Additionally or alternatively, the buffer mode represented by security mode 122(2) in FIG. 4 may cause and/or enable security proxy 120 to buffer and/or hold certain packets encountered at network device 206 until completion of the security inspection in connection with the online communication session. This buffer mode may also cause and/or enable security proxy 120 to reassemble certain packets to facilitate the security inspection. This buffer mode may further cause and/or enable security proxy 120 to transmit the packets upon completion of the security inspection.

In order to facilitate buffering for the security inspection, security proxy 120 may send an acknowledgement to the computing device that is providing the communication stream being inspected. For example, security proxy 120 may send an acknowledgement to computing device 202(N). In this example, the acknowledgement may prompt computing device 202(N) to send additional data to security proxy 120 via the communication stream. Additionally or alternatively, security proxy 120 may initiate one or more other functions necessary to facilitate the security inspection.

In one example, security mode 122(2) may represent the most efficient security mode for UTM applications and/or antivirus applications in certain contexts. For example, in the event that application 208(1) represents and/or includes a UTM application and/or an antivirus application that needs the communication stream to be buffered (but not modified) for the security inspection, determination module 108 may determine that security mode 122(2) is the most efficient security mode that satisfies the needs of application 208(1). In this example, security mode 122(2) may cause and/or enable security proxy 120 to completely buffer a certain number of packets for the security inspection.

Security mode 122(2) may also cause and/or enable security proxy 120 to revert back to security mode 122(1) (e.g., the pass-through mode) after transmission of the inspected packets. Accordingly, security mode 122(2) may be a temporary mode.

As illustrated in FIG. 4, security mode 122(3) may represent a re-write mode (in this example, "a re-write mode that causes and/or enables Security Proxy 120 to modify the content of a communication stream transferred between computing devices 202(1)-(N) on a temporary basis"). In one example, the re-write mode represented by security mode 122(3) in FIG. 5 may cause and/or enable security proxy 120 to modify the content of the communication stream and then close the online communication session upon completion of the modification. Additionally or alternatively, this re-write mode may cause and/or enable security proxy 120 to modify the content of the communication stream and then continue facilitating the online communication session even after completion of the modification. This re-write mode may further cause and/or enable security proxy 120 to rewrite the packet number sequence, update the checksum during the rewrite, and/or change the content.

In one example, security mode 122(3) may represent the most efficient security mode for UTM applications and/or antivirus applications in certain contexts. For example, in the event that application 208(1) represents and/or includes a UTM application and/or an antivirus application that detects a malicious payload in the communication stream buffered for the security inspection, determination module 108 may determine that security mode 122(3) is the most efficient security mode that satisfies the needs of application 208(1). In this example, security mode 122(3) may cause and/or enable security proxy 120 to modify the content of the communication stream by removing and/or preventing delivery of the malicious payload detected in the communication stream. Security mode 122(3) may further cause and/or enable security proxy 120 to close the online communication session upon removing and/or preventing delivery of the malicious payload.

In another example, security mode 122(3) may represent the most efficient security mode for ALGs in certain contexts. For example, in the event that application 208(1) represents and/or includes an ALG that needs the contents of a header and/or a payload identified in the communication stream to be modified during the security inspection, determination module 108 may determine that security mode 122(3) is the most efficient security mode that satisfies the needs of application 208(1). In this example, security mode 122(3) may cause and/or enable security proxy 120 to modify the buffer, the checksum, and/or the number sequence of packets identified in the communication stream. Security mode 122(3) may further cause and/or enable security proxy 120 to transmit the packets upon completion of the modification.

Security mode 122(3) may also cause and/or enable security proxy 120 to revert back to security mode 122(1) (e.g., the pass-through mode) and/or security mode 122(2) (e.g., the buffer mode) after transmission of the modified packets. Accordingly, security mode 122(3) may be a temporary mode.

As illustrated in FIG. 4, security mode 122(4) may represent a full proxy mode (in this example, "a full proxy mode that causes and/or enables Security Proxy 120 to modify the content of a communication stream transferred between computing devices 202(1)-(N) on a substantially continuous basis"). In this specific example, the full proxy mode represented by security mode 122(4) in FIG. 5 may cause and/or enable security proxy 120 to modify all of the packets encountered at network device 206 during the security inspection in connection with the online communication session.

In one example, security mode 122(4) may represent the most efficient security mode for SSL proxies in certain contexts. For example, in the event that application 208(1) represents and/or includes an SSL forwarding proxy, determination module 108 may determine that security mode 122(4) is the most efficient (and potentially the only) security mode that satisfies the needs of application 208(1). In this example, security mode 122(4) may cause and/or enable security proxy 120 to modify the buffer, the checksum, and/or the number sequence of packets identified in the communication stream. Security mode 122(4) may further cause and/or enable security proxy 120 to transmit the packets upon completion of the modification. However, unlike security mode 122(3), security mode 122(4) may cause and/or enable security proxy 120 to persist in security mode 122(4) without reverting back to security mode 122(1) (e.g., the pass-through mode) after transmission of the modified packets. Accordingly, security mode 122(4) may represent and/or include a complete TCP proxy.

In some examples, determination module 108 may determine the security mode for security proxy 120 based at least in part on a plurality of applications 208(1)-(N) and/or by monitoring the communication stream. For example, in the event that all of applications 208(1)-(N) are involved in the online communication session, determination module 108 may determine which of security modes 122(1)-(N) is the most efficient security mode that satisfies the needs of all of applications 208(1)-(N). In this example, determination module 108 may determine that security mode 122(1) is the most efficient security mode that satisfies the needs of all of applications 208(1)-(N).

As illustrated in FIG. 3, at step 308 one or more of the systems described herein may configure the security proxy to inspect the online communication session in accordance with the determined security mode. For example, configuration module 110 may, as part of network device 206 in FIG. 2, configure security proxy 120 to inspect the online communication session in accordance with security mode 122(1). In other words, configuration module 110 may apply security mode 122(1) to security proxy 120 such that security mode 122(1) controls the security inspection performed by security proxy 120 on the online communication session.

The systems described herein may perform step 308 in a variety of ways. In one example, configuration module 110 may configure security proxy 120 during an ongoing online communication session. For example, configuration module 110 may configure security proxy 120 to perform the security inspection on the communication stream currently being handled by application 208(1) in connection with the online communication session. Additionally or alternatively, configuration module 110 may modify the configuration of security proxy 120 to adjust and/or optimize the security inspection being performed on the communication stream handled by application 208(1) in connection with the online communication session.

In one example, configuration module 110 may configure security proxy 120 at the outset of a newly established online communication session. For example, configuration module 110 may configure security proxy 120 to perform the security inspection on a new and/or impending communication stream to be handled by application 208(1) in connection with the online communication session. Additionally or alternatively, configuration module 110 may modify the configuration of security proxy 120 to adjust and/or optimize the impending security inspection to be performed on the communication stream handled by application 208(1) in connection with the online communication session.

Upon completion of this configuration, network device 206 may use security proxy 120 to perform the security inspection on the communication stream involved in the online communication session in accordance with the security mode 122. For example, security proxy 120 may inspect certain packets encountered at network device 206 in connection with the online communication session in accordance with security mode 122(2) in FIG. 4. Additionally or alternatively, security proxy 120 may inspect certain packets encountered at network device 206 in connection with the online communication session in accordance with security mode 122(3) in FIG. 5.

In some examples, security proxy 120 may select and/or change the security mode once or more during the life of the online communication session established between computing devices 202(1) and 202(N). In other words, security proxy 120 may continue determining and/or reconfiguring the most efficient security mode throughout the life of the online communication session depending on the behavior of one or more of applications 208(1)-(N) involved in the online communication session. This process may continue until termination of the online communication session and/or until security proxy 120 no longer needs to accommodate any of applications 208(1)-(N).

As explained above in connection with method 300 in FIG. 3, a polymorphic security proxy may inspect online communication sessions in accordance with the most efficient security mode. For example, a polymorphic security proxy may identify an antivirus application performing a security inspection on a TCP session established between a server and a client. In this example, the polymorphic security proxy may determine that the buffer mode is the most efficient security mode for the TCP session based at least in part the antivirus application. In other words, the polymorphic security proxy may select the buffer mode since the buffer mode causes the lowest level of resource consumption while satisfying the needs of the antivirus application.

The polymorphic security proxy may then apply the buffer mode to the TCP session. By applying the buffer mode to the TCP session in this way, the polymorphic security proxy may lead to a reduction in the amount of time and/or network resources consumed in connection with the security inspection. For example, the selected security mode may cause and/or enable the polymorphic security proxy to perform a security inspection on the TCP session such that the server and/or client emulators need not save certain packets, timers, and/or acknowledgements nor perform certain retransmissions to facilitate the security inspection.

Figure 6:
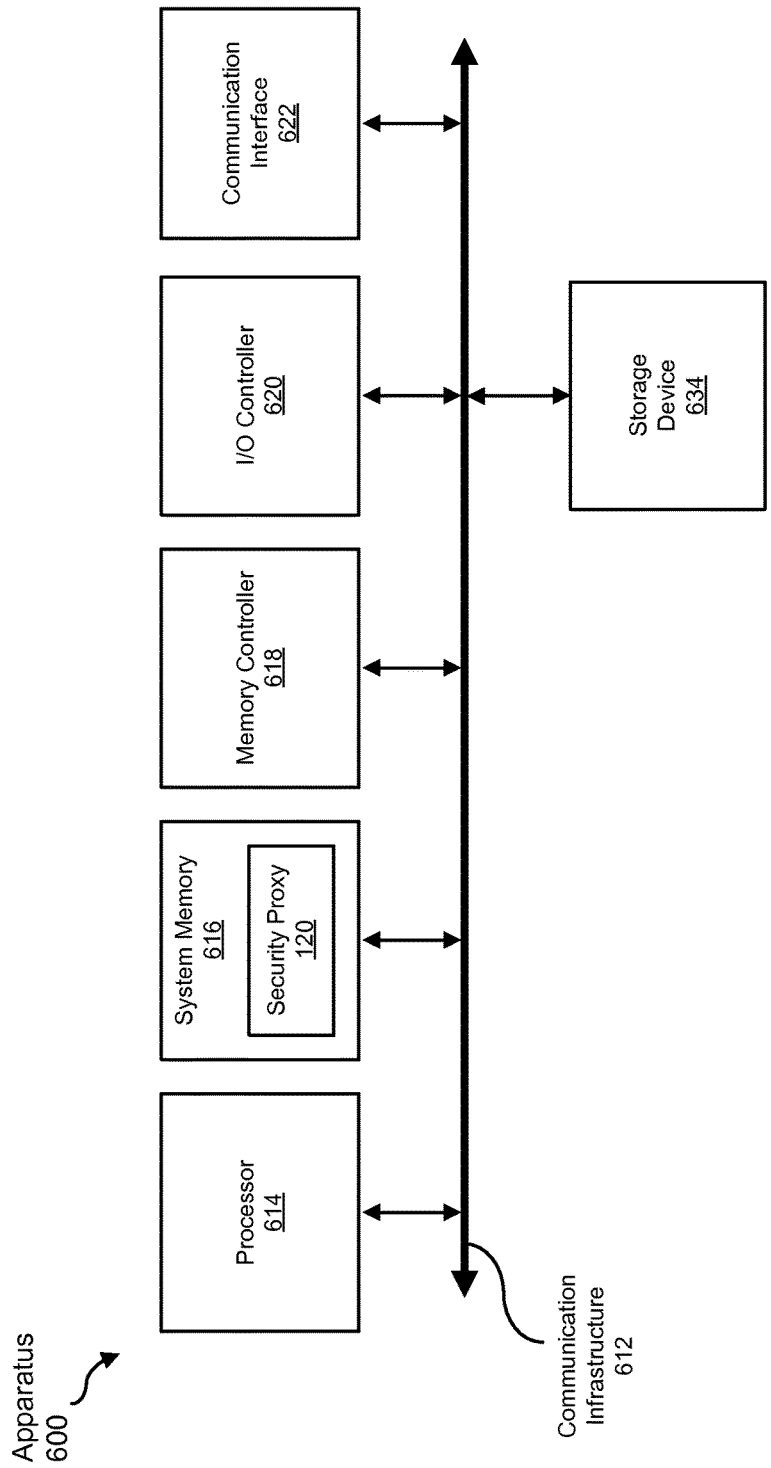
FIG. 6 is a block diagram of an exemplary computing system capable of implementing and/or being used in connection with one or more of the embodiments described and/or illustrated herein.

FIG. 6 is a block diagram of an exemplary apparatus 600 capable of implementing and/or being used in connection with one or more of the embodiments described and/or illustrated herein. In some embodiments, all or a portion of apparatus 600 may perform and/or be a means for performing, either alone or in combination with other elements, one or more of the steps described in connection with FIG. 3. All or a portion of apparatus 600 may also perform and/or be a means for performing and/or implementing any other steps, methods, or processes described and/or illustrated herein.

Apparatus 600 broadly represents any type or form of electrical load, including a single or multi-processor computing device or system capable of executing computer-readable instructions. Examples of apparatus 600 include, without limitation, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), workstations, laptops, client-side terminals, servers, distributed computing systems, mobile devices, combinations of one or more of the same, or any other type or form of apparatus or device.

Apparatus 600 may be programmed, configured, and/or otherwise designed to comply with one or more networking protocols. According to certain embodiments, apparatus 600 may be designed to work with protocols of one or more layers of the OSI reference model, such as a physical layer protocol, a link layer protocol, a network layer protocol, a transport layer protocol, a session layer protocol, a presentation layer protocol, and/or an application layer protocol. For example, apparatus 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Apparatus 600 may include various network and/or computing components. For example, apparatus 600 may include at least one processor 614 and a system memory 616. In this example, system memory 616 may be programmed with security proxy 120. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments apparatus 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary apparatus 600 may also include one or more components or elements in addition to processor 614 and system memory 616. For example, as illustrated in FIG. 6, apparatus 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of apparatus 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of apparatus 600, such as processor 614, system memory 616, communication interface 622, and storage interface 630.

Communication interface 622 broadly represents any type or form of communication device or adapter capable of facilitating communication between exemplary apparatus 600 and one or more additional devices. For example, in certain embodiments communication interface 622 may facilitate communication between apparatus 600 and a private or public network including additional apparatuses. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between apparatus 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable apparatus 600 to engage in distributed or remote computing. For example, communication interface 622 may receive instructions from a remote device or send instructions to a remote device for execution.

As illustrated in FIG. 6, exemplary apparatus 600 may also include a storage device 634 coupled to communication infrastructure 612. Storage device 634 generally represents any type or form of storage device or medium capable of storing data and/or other computer-readable instructions. For example, storage device 634 may represent a magnetic disk drive (e.g., a so-called hard drive), a solid state drive, a floppy disk drive, a magnetic tape drive, an optical disk drive, a flash drive, or the like.

In certain embodiments, storage device 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 634 may also include other similar structures or devices for allowing computer software, data, or other computer-readable instructions to be loaded into apparatus 600. For example, storage device 634 may be configured to read and write software, data, or other computer-readable information. Storage device 634 may be a part of apparatus 600 or may be separate devices accessed through other interface systems.

Many other devices or subsystems may be connected to apparatus 600. Conversely, all of the components and devices illustrated in FIG. 6 need not be present to practice the embodiments described and/or illustrated herein. The devices and subsystems referenced above may also be interconnected in different ways from those shown in FIG. 6. Apparatus 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may transform a configuration of a security proxy, output and use a result of the transformation to inspect an online communication session, and store the result of the transformation to facilitate additional inspections at a future time. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A method comprising:
  detecting an online communication session established between a plurality of computing devices;
  identifying one or more applications involved in the online communication session established between the plurality of computing devices;
  determining a security mode for a security proxy that includes a server emulator and a client emulator, wherein:
  the plurality of computing devices communicate with one another via the server emulator and the client emulator included in the security proxy; and
  the security proxy inspects the online communication session by:

identifying a set of security modes that cause varying levels of resource consumption when the security proxy inspects online communication sessions;

identifying one or more requirements of the applications involved in the online communication session by:

monitoring behavior of the online communication session, wherein the behavior of the online communication session comprises at least one of:

reassembling a communication stream of the online communication session;

buffering a communication stream of the online communication session; and modifying a communication stream of the online communication session; and deducing, based at least in part on the behavior of the online communication session, the applications involved in the online communication session and the requirements of the applications involved in the online communication session; selecting, from the set of security modes, the security mode that:

satisfies the requirements of the applications involved in the online communication session; and when implemented by the security proxy, causes the lowest level of resource consumption among the security modes that satisfy the requirements of the applications;

upon determining the security mode for the security proxy, configuring the security proxy to inspect the online communication session in accordance with the determined security mode; and wherein the security mode enables the server emulator and the client emulator included in the security proxy to avoid saving certain packets, timers, and acknowledgements from the communication stream of the online communication session unless the applications require the certain packets, timers, or acknowledgements.

2. The method of claim 1, wherein: the online communication session comprises a Transmission Control Protocol (TCP) session; and the security proxy comprises a TCP proxy.

3. The method of claim 1, wherein identifying the applications involved in the online communication session comprises: detecting a service request in connection with the online communication session; and identifying, based at least in part on the service request, the applications involved in the online communication session.

4. The method of claim 1, wherein identifying the applications involved in the online communication session comprises: monitoring behavior of the online communication session; and deducing, based at least in part on the behavior of the online communication session, the applications involved in the online communication session.

5. The method of claim 1, wherein the determined security mode comprises a pass-through mode that enables the security proxy to transfer a communication stream involved in the online communication session without buffering the communication stream or modifying the content of the communication stream.

6. The method of claim 1, wherein the determined security mode comprises a buffer mode that enables the security proxy to buffer a communication stream involved in the online communication session for a security inspection without modifying the content of the communication stream.

7. The method of claim 1, wherein the determined security mode comprises a re-write mode that enables the security proxy to modify the content of a communication stream involved in the online communication session on a temporary basis.

8. The method of claim 1, wherein the determined security mode comprises a full proxy mode that enables the security proxy to modify the content of a communication stream involved in the online communication session on a continuous basis.

9. The method of claim 1, further comprising using the security proxy to perform a security inspection on a communication stream involved in the online communication session in accordance with the determined security mode.

10. A system comprising:

a detection module, stored in memory, that detects an online communication session established between a plurality of computing devices;

an identification module, stored in memory, that identifies one or more applications involved in the online communication session established between the plurality of computing devices;

a determination module, stored in memory, that determines a security mode for a security proxy that includes a server emulator and a client emulator, wherein:

the plurality of computing devices communicate with one another via the server emulator and the client emulator included in the security proxy; and the security proxy inspects the online communication session by:

identifying a set of security modes that cause varying levels of resource consumption when the security proxy inspects online communication sessions;

identifying one or more requirements of the applications involved in the online communication session by:

monitoring behavior of the online communication session, wherein the behavior of the online communication session comprises at least one of:

reassembling a communication stream of the online communication session;

buffering a communication stream of the online communication session; and modifying a communication stream of the online communication session;

deducing, based at least in part on the behavior of the online communication session, the applications involved in the online communication session and the requirements of the applications involved in the online communication session;

selecting, from the set of security modes, the security mode that:

satisfies the requirements of the applications involved in the online communication session; and when implemented by the security proxy, causes the lowest level of resource consumption among the security modes that satisfy the requirements of the applications;

a configuration module, stored in memory, that configures the security proxy to inspect the online communication session in accordance with the determined security mode;

wherein the security mode enables the server emulator and the client emulator included in the security proxy to avoid saving certain packets, timers, and acknowledgements from the communication stream of the online communication session unless the applications require the certain packets, timers, or acknowledgements; and at least one processor that executes the detection module, the identification module, the determination module, and the configuration module.

11. The system of claim 10, wherein: the online communication session comprises a Transmission Control Protocol (TCP) session; and the security proxy comprises a TCP proxy.

12. The system of claim 10, wherein: the detection module detects a service request in connection with the online communication session; and the identification module identifies, based at least in part on the service request, the applications involved in the online communication session.

13. The system of claim 10, wherein: the detection module monitors behavior of the online communication session; and the identification module deduces, based at least in part on the behavior of the online communication session, the applications involved in the online communication session.

14. The system of claim 10, wherein the determined security mode comprises a pass-through mode that enables the security proxy to transfer a communication.

15. The system of claim 10, wherein the determined security mode comprises a buffer mode that enables the security proxy to buffer a communication stream involved in the online communication session for a security inspection without modifying the content of the communication stream.

16. An apparatus comprising:
a server that facilitates an online communication session established between a plurality of computing devices; and
a security proxy that:
includes a server emulator and a client emulator, wherein the plurality of computing devices communicate with one another via the server emulator and the client emulator included in the security proxy; and
directs the server to:
identify one or more applications involved in the online communication session established between the plurality of computing devices;
determine a security mode for inspecting the online communication session by:
identifying a set of security modes that cause varying levels of resource consumption when the security proxy inspects online communication sessions;
identifying one or more requirements of the applications involved in the online communication session by:

monitoring behavior of the online communication session, wherein the behavior of the online communication session comprises at least one of:
reassembling a communication stream of the online communication session;
buffering a communication stream of the online communication session; and
modifying a communication stream of the online communication session; and
deducing, based at least in part on the behavior of the online communication session, the applications involved in the online communication session and the requirements of the applications involved in the online communication session;
selecting, from the set of security modes, the security mode that:
satisfies the requirements of the applications involved in the online communication session; and
when implemented by the security proxy, causes the lowest level of resource consumption among the security modes that satisfy the requirements of the applications; and
inspect the online communication session in accordance with the determined security mode; and
wherein the security mode enables the server emulator and the client emulator included in the security proxy to avoid saving certain packets, timers, and acknowledgements from the communication stream of the online communication session unless the applications require the certain packets, timers, or acknowledgements.

17. The method of claim 1, wherein the requirements of the applications involved in the online communication session comprise at least one of: transferring a communication stream involved in the online communication session between the plurality of computing devices without performing a security inspection on the communication stream; buffering a communication stream involved in the online communication session; modifying the content of a communication stream involved in the online communication session; reassembling a communication stream involved in the online communication session; and saving a local copy of at least a portion of a communication stream involved in the online communication session.

* * * * *